US011097622B2

United States Patent
Shigeeda (10) Patent No.: US 11,097,622 B2
(45) Date of Patent: Aug. 24, 2021

(54) INTER-VEHICLE TRANSMISSION SYSTEM AND TRANSMISSION DEVICE

(71) Applicant: Mitsubishi Electric Corporation, Tokyo (JP)

(72) Inventor: Tetsuya Shigeeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/342,603

(22) PCT Filed: Oct. 24, 2016

(86) PCT No.: PCT/JP2016/081461
§ 371 (c)(1),
(2) Date: Apr. 17, 2019

(87) PCT Pub. No.: WO2018/078696
PCT Pub. Date: May 3, 2018

(65) Prior Publication Data
US 2019/0263273 A1 Aug. 29, 2019

(51) Int. Cl.
*B60L 15/42* (2006.01)
*B61G 5/10* (2006.01)
(Continued)

(52) U.S. Cl.
CPC ............... *B60L 15/42* (2013.01); *B61G 5/10* (2013.01); *H01H 1/605* (2013.01); *H04B 3/02* (2013.01); *H04B 3/548* (2013.01)

(58) Field of Classification Search
CPC ........... B60L 15/42; B61G 5/10; H01H 1/605; H04B 3/02; H04B 3/548
(Continued)

(56) References Cited

U.S. PATENT DOCUMENTS

| 8,488,617 B2 * | 7/2013 | Takeyama ........... H04L 12/4625 370/400 |
| 2004/0264087 A1 * | 12/2004 | Bishop ................. H04M 1/745 361/91.1 |
| 2016/0134319 A1 | 5/2016 | Shigeeda |

FOREIGN PATENT DOCUMENTS

| EP | 2139171 A1 | 12/2009 |
| EP | 3010103 A1 | 4/2016 |

(Continued)

OTHER PUBLICATIONS

Extended European Search Report dated Sep. 17, 2019 for corresponding European patent application No. 16920264.5, 12 pages.
(Continued)

*Primary Examiner* — Michael R. Fin
(74) *Attorney, Agent, or Firm* — Buchanan Ingersoll & Rooney PC (57) ABSTRACT

A transmission device includes a pair of terminals connected to an electrical coupler via a pair of signal lines, a transmission unit connected to the pair of terminals via a pair of capacitor, and a DC power supply, a switch, and inductances, each connected in series between the pair of terminals without interposition of the pair of capacitors. A transmission device includes a pair of terminals connected to an electrical coupler via a pair of signal lines, a reception unit connected to the pair of terminals via a pair of capacitors, and a load resistor and inductances each connected in series between the pair of terminals without interposition of the pair of capacitors.

13 Claims, 8 Drawing Sheets

(51) Int. Cl.
*H04B 3/54* (2006.01)
*H01H 1/60* (2006.01)
*H04B 3/02* (2006.01)

(58) Field of Classification Search
USPC .................................................. 307/10.1, 9.1
See application file for complete search history.

(56) References Cited

FOREIGN PATENT DOCUMENTS

| | | |
|---|---|---|
| JP | H02071621 A | 3/1990 |
| JP | 2013252172 A | 12/2013 |
| JP | 2016019417 A | 2/2016 |
| WO | 2014199431 A1 | 12/2014 |

OTHER PUBLICATIONS

International Search Report (with English translation) and Written Opinion issued in corresponding International Patent Application No. PCT/ PCT/JP2016/081461, 12 pages (Jan. 17, 2017).
Notification of Reasons for Refusal (with Machine Translation) issued in corresponding Japanese Patent Application No. 2017-552519, 9 pages (Nov. 1, 2017).

* cited by examiner

INTER-VEHICLE TRANSMISSION SYSTEM AND TRANSMISSION DEVICE

FIELD

The present invention relates to an inter-vehicle transmission system and to a transmission device for signal transmission between vehicles electrically connected to each other through an electrical coupler.

BACKGROUND

Conventionally, vehicles electrically connected to each other through an electrical coupler communicate with each other through contacts of the electrical coupler provided on the vehicles.

An oxide covering may be formed on the surface of the contact. The oxide covering formed on the surface of the contact may cause a poor connection between the contacts and thus erroneous transmission in communication between the vehicles.

For the signal transmission scheme described in Patent Literature 1, a transmission device and a reception device are connected to each other through an electrical coupler on a wired line such that the transmission device sends a signal to the reception device through contacts of the electrical coupler. For this signal transmission scheme, also, the transmission unit includes a direct-current (DC) power supply for breaking the oxide covering on the contacts to ensure electrical connection between the contacts, and the reception unit includes a load resistor electrically connected to the DC power supply. This signal transmission scheme superimposes a signal on a DC component supplied by the DC power supply, and the DC component is consumed by a load resistor.

CITATION LIST

Patent Literature

Patent Literature 1: Japanese Patent Application Laid-open No. H2-71621

SUMMARY

Technical Problem

For the signal transmission scheme described in Patent Literature 1, unfortunately, the DC component supplied by the DC power supply is constantly applied to the electrical coupler, thereby resulting in an increased amount of heat generation in the load resistor, and thus resulting in increased power consumption.

The present invention has been made in view of the foregoing, and it is an object of the present invention to provide an inter-vehicle transmission system that reduces the amount of heat generation in a load resistor to reduce power consumption, as well as breaking the oxide film on the surface of a contact of an electrical coupler.

Solution to Problem

To solve the above problem and achieve the object, an inter-vehicle transmission system according to the present invention comprises: a first transmission device disposed in a first vehicle including a first electrical coupler; and a second transmission device disposed in a second vehicle including a second electrical coupler electrically connected to the first electrical coupler, the second transmission device being capable of communicating with the first transmission device, wherein the first transmission device includes a first pair of terminals connected to the first electrical coupler via a first pair of signal lines, a transmission unit connected to the first pair of terminals via a first pair of capacitors, a direct-current power supply connected in series between the first pair of terminals without interposition of the first pair of capacitors, and a switch connected in series to the direct-current power supply between the first pair of terminals, a first inductance connected in series to the DC power supply between the first pair of terminals, and the second transmission device includes a second pair of terminals connected to the second electrical coupler via a second pair of signal lines, a reception unit connected to the second pair of terminals via a second pair of capacitors, a load resistor connected in series between the second pair of terminals without interposition of the second pair of capacitors, and a second inductance connected in series to the load resistor between the second pair of terminals.

Advantageous Effects of Invention

The present invention provides an advantage in reducing the amount of heat generation in a load resistor to reduce power consumption, as well as breaking the oxide film on the surface of the contact of the electrical coupler.

DESCRIPTION OF EMBODIMENTS

An inter-vehicle transmission system and an inter-vehicle transmission device according to embodiments of the present invention will be described in detail below with reference to the drawings. Note that these embodiments are not intended to limit the scope of this invention.

First Embodiment

Figure 1:
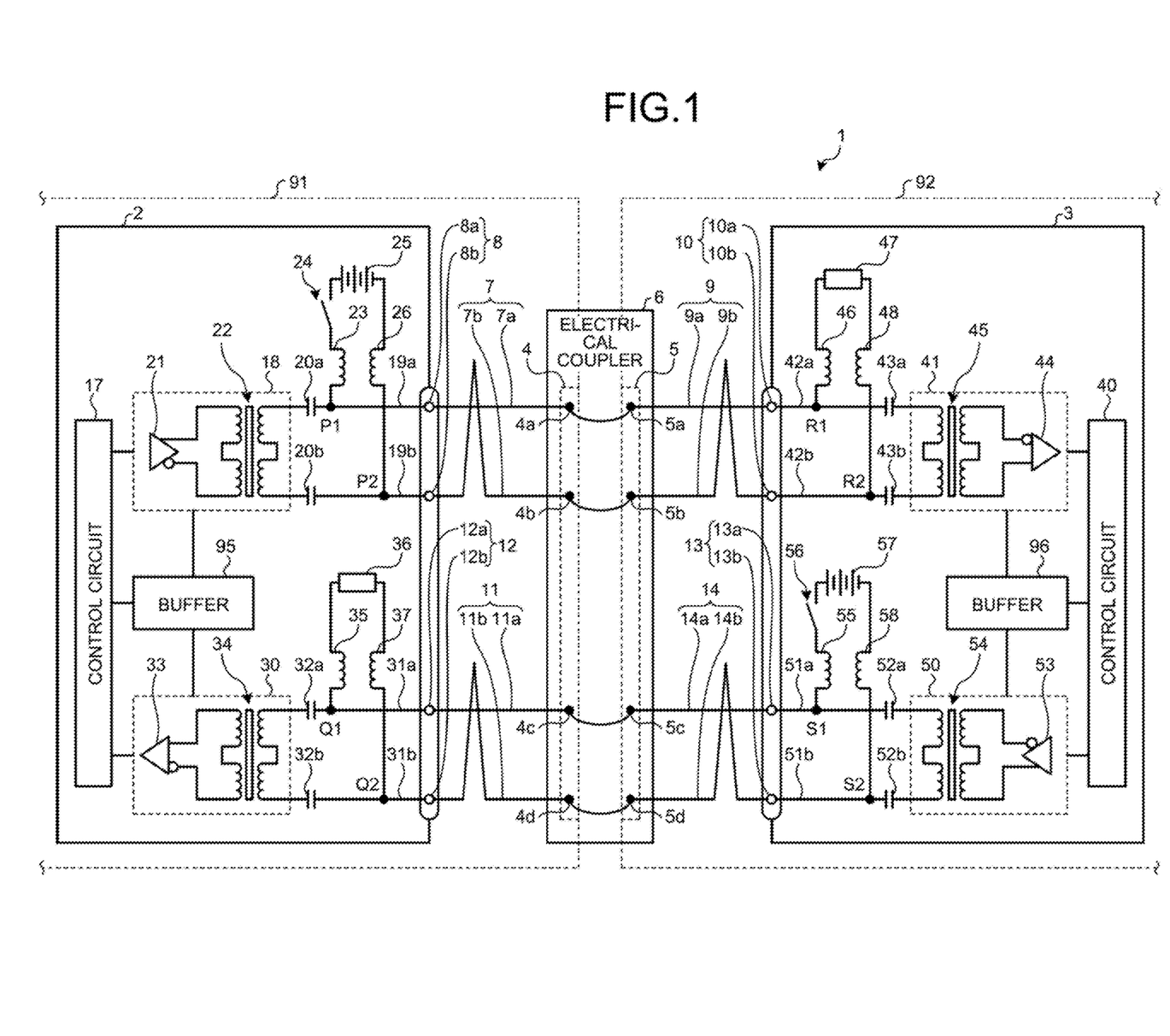
FIG. 1 is a diagram illustrating a configuration of an inter-vehicle transmission system according to a first embodiment.

FIG. 1 is a diagram illustrating a configuration of an inter-vehicle transmission system according to the present embodiment. The inter-vehicle transmission system 1 includes a transmission device 2 disposed in a vehicle 91, and a transmission device 3 disposed in a vehicle 92. The transmission device 3 is mechanically coupled to the vehicle 91 and capable of communicating with the transmission device 2. The vehicles 91 and 92 are each a train vehicle. The vehicle 91 is a first vehicle, and the vehicle 92 is a second vehicle. The transmission device 2 is a first transmission device, and the transmission device 3 is a second transmission device.

The vehicle 91 includes an electrical coupler 4, i.e., a first electrical coupler. The electrical coupler 4 includes a pair of contacts 4a and 4b and a pair of contacts 4c and 4d. The vehicle 92 includes an electrical coupler 5, i.e., a second electrical coupler. The electrical coupler 5 includes a pair of contacts 5a and 5b and a pair of contacts 5c and 5d. The electrical coupler 5 can be electrically coupled to the electrical coupler 4. The illustrated example illustrates the electrical couplers 4 and 5 electrically coupled to each other as defining an electrical coupler 6, in which the contact 4a is in contact with the contact 5a, the contact 4b is in contact with the contact 5b, the contact 4c is in contact with the contact 5c, and the contact unit 4d is in contact with the contact 5d.

The transmission device 2 includes a pair of terminals 8 and a pair of terminals 12. The pair of terminals 8 includes terminals 8a and 8b. The pair of terminals 12 includes terminals 12a and 12b. The transmission device 3 includes a pair of terminals 10 and a pair of terminals 13. The pair of terminals 10 includes terminals 10a and 10b. The pair of terminals 13 includes terminals 13a and 13b. The pair of terminals 8 is a first pair of terminals, and the pair of terminals 10 is a second pair of terminals.

The pair of terminals 8 is connected to the electrical coupler 4 via a pair of signal lines 7. The pair of signal lines 7 includes signal lines 7a and 7b. In more detail, the terminal 8a is connected to the contact 4a of the electrical coupler 4 via the signal line 7a, and the terminal 8b is connected to the contact 4b of the electrical coupler 4 via the signal line 7b. The pair of signal lines 7 is, for example, a twisted pair cable that serves as a transmission line. The twisted pair cable is, for example, an Ethernet (registered trademark) cable. The pair of signal lines 7 is a first pair of signal lines.

The pair of terminals 12 is connected to the electrical coupler 4 via a pair of signal lines 11. The pair of signal lines 11 includes signal lines 11a and 11b. In more detail, the terminal 12a is connected to the contact 4c of the electrical coupler 4 via the signal line 11a, and the terminal 12b is connected to the contact unit 4d of the electrical coupler 4 via the signal line 11b. The pair of signal lines 11 is, for example, a twisted pair cable that serves as a transmission line. The twisted pair cable is, for example, an Ethernet (registered trademark) cable.

The pair of terminals 10 is connected to the electrical coupler 5 via a pair of signal lines 9. The pair of signal lines 9 includes signal lines 9a and 9b. In more detail, the terminal 10a is connected to the contact 5a of the electrical coupler 5 via the signal line 9a, and the terminal 10b is connected to the contact 5b of the electrical coupler 5 via the signal line 9b. The pair of signal lines 9 is, for example, a twisted pair cable that serves as a transmission line. The twisted pair cable is, for example, an Ethernet (registered trademark) cable. The pair of signal lines 9 is a second pair of signal lines.

The pair of terminals 13 is connected to the electrical coupler 5 via a pair of signal lines 14. The pair of signal lines 14 includes signal lines 14a and 14b. In more detail, the terminal 13a is connected to the contact 5c of the electrical coupler 5 via the signal line 14a, and the terminal 13b is connected to the contact 5d of the electrical coupler 5 via the signal line 14b. The pair of signal lines 14 is, for example, a twisted pair cable that serves as a transmission line. The twisted pair cable is, for example, an Ethernet (registered trademark) cable.

The configuration of the transmission device 2 will next be described. The transmission device 2 includes a transmission unit 18, a direct-current (DC) power supply 25, and a switch 24, and inductances 23, 26. The transmission unit 18 is connected to the pair of terminals 8 via a pair of capacitors 20a and 20b. The DC power supply 25 is connected in series between the terminals 8a and 8b without interposition of the pair of capacitors 20a and 20b. The switch 24 is connected in series to the DC power supply 25 between the terminals 8a and 8b. The inductances 23, 26 are connected in series to the DC power supply 25 between the terminals 8a and 8b. The pair of capacitors 20a and 20b is a first pair of capacitors. The inductances 23, 26 are first inductances.

The transmission unit 18 can send a signal to the transmission device 3. The transmission unit 18 includes a transmission circuit 21, and a pulse transformer 22 connected to the transmission circuit 21. The transmission circuit 21 sends a signal through the pulse transformer 22. The signal is a differential signal.

The transmission unit 18 is connected to the pair of terminals 8 via the pair of capacitors 20a and 20b and via a pair of signal lines 19a and 19b. In more detail, the capacitor 20a has one end connected to the transmission unit 18, and has the other end connected to the terminal 8a via the signal line 19a. The capacitor 20b has one end connected to the transmission unit 18, and has the other end connected to the terminal 8b via the signal line 19b.

The inductance 23 has one end connected to the signal line 19a at a point between the other end of the capacitor 20a and the terminal 8a. The connection point between the one end of the inductance 23 and the signal line 19a is designated by P1. The inductance 23 has the other end connected to one end of the switch 24. The switch 24 has the other end connected to one end (in the illustrated example, the positive electrode end) of the DC power supply 25. The DC power supply 25 has the other end (in the illustrated example, the negative electrode end) connected to one end of the inductance 26. The inductance 26 has the other end connected to the signal line 19b at a point between the other end of the capacitor 20b and the terminal 8b. The connection point between the other end of the inductance 26 and the signal line 19b is designated by P2. The pair of inductances 23 and 26 is disposed on opposite sides of the DC power supply 25.

The transmission device 2 also includes a reception unit 30, a load resistor 36, and inductances 35 and 37. The reception unit 30 is connected to the pair of terminals 12 via a pair of capacitors 32a and 32b. The load resistor 36 is connected in series between the terminals 12a and 12b without interposition of the pair of capacitors 32a and 32b. The inductances 35 and 37 are connected in series to the load resistor 36 between the terminals 12a and 12b.

The reception unit 30 can receive a signal from the transmission device 3. The reception unit 30 includes a reception circuit 33, and a pulse transformer 34 connected to the reception circuit 33. The reception circuit 33 receives a signal through the pulse transformer 34. The signal is a differential signal.

The reception unit 30 is connected to the pair of terminals 12 via the pair of capacitors 32a and 32b and via a pair of signal lines 31a and 31b. In more detail, the capacitor 32a has one end connected to the reception unit 30, and has the other end connected to the terminal 12a via the signal line 31a. The capacitor 32b has one end connected to the reception unit 30, and has the other end connected to the terminal 12b via the signal line 31b.

The inductance 35 has one end connected to the signal line 31a at a point between the other end of the capacitor 32a and the terminal 12a. The connection point between the one end of the inductance 35 and the signal line 31a is designated by Q1. The inductance 35 has the other end connected to one end of the load resistor 36. The load resistor 36 has the other end connected to one end of the inductance 37. The inductance 37 has the other end connected to the signal line 31b at a point between the other end of the capacitor 32b and the terminal 12b. The connection point between the other end of the inductance 37 and the signal line 31b is designated by Q2. The pair of inductances 35 and 37 is disposed on opposite sides of the load resistor 36.

The transmission device 2 further includes a control circuit 17 and a buffer 95. The control circuit 17 is connected to the transmission unit 18 and to the reception unit 30. The buffer 95 is connected to the control circuit 17, to the transmission unit 18, and to the reception unit 30.

The control circuit 17 controls signal transmission performed by the transmission unit 18 and signal reception performed by the reception unit 30. The control circuit 17 also controls on-off switching of the switch 24.

Figure 2:
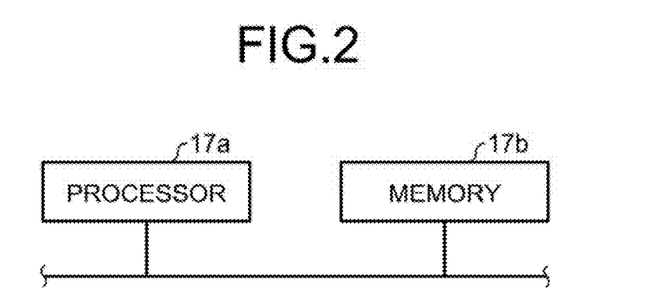
FIG. 2 is a diagram illustrating an example of the configuration of the control circuit in the first embodiment.

FIG. 2 is a diagram illustrating an example of the configuration of the control circuit 17. As illustrated in FIG. 2, the control circuit 17 includes a processor 17a and a memory 17b. Typically, the processor 17a is a central processing unit (CPU), and the memory 17b is a random access memory (RAM) and a read-only memory (ROM). The memory 17b stores a control program. In the control circuit 17, the processor 17a reads and executes a control program stored in the memory 17b. The control circuit 17 may be a dedicated hardware element, e.g., a processing circuit.

The buffer 95 temporarily stores transmission data that is to be output to the transmission unit 18. The buffer 95 also temporarily stores reception data output from the reception unit 30.

The configuration of the transmission device 3 will next be described. The transmission device 3 includes a reception unit 41, a load resistor 47, and inductances 46 and 48. The reception unit 41 is connected to the pair of terminals 10 via a pair of capacitors 43a and 43b. The load resistor 47 is connected in series between the terminals 10a and 10b without interposition of the pair of capacitors 43a and 43b. The inductances 46 and 48 are connected in series to the load resistor 47 between the terminals 10a and 10b. The pair of capacitors 43a and 43b is a second pair of capacitors, and the inductances 46 and 48 are second inductances.

The reception unit 41 can receive a signal from the transmission device 2. The reception unit 41 includes a reception circuit 44, and a pulse transformer 45 connected to the reception circuit 44. The reception circuit 44 receives a signal through the pulse transformer 45. The signal is a differential signal.

The reception unit 41 is connected to the pair of terminals 10 via the pair of capacitors 43a and 43b and via a pair of signal lines 42a and 42b. In more detail, the capacitor 43a has one end connected to the reception unit 41, and has the other end connected to the terminal 10a via the signal line 42a. The capacitor 43b has one end connected to the reception unit 41, and has the other end connected to the terminal 10b via the signal line 42b.

The inductance 46 has one end connected to the signal line 42a at a point between the other end of the capacitor 43a and the terminal 10a. The connection point between the one end of the inductance 46 and the signal line 42a is designated by R1. The inductance 46 has the other end connected to one end of the load resistor 47. The load resistor 47 has the other end connected to one end of the inductance 48. The inductance 48 has the other end connected to the signal line 42b at a point between the other end of the capacitor 43b and the terminal 10b. The connection point between the other end of the inductance 48 and the signal line 42b is designated by R2. The pair of inductances 46 and 48 is disposed on opposite sides of the load resistor 47.

The transmission device 3 also includes a transmission unit 50, a DC power supply 57, a switch 56, and inductances 55 and 58. The transmission unit 50 is connected to the pair of terminals 13 via a pair of capacitors 52a and 52b. The DC power supply 57 is connected in series between the terminals 13a and 13b without interposition of the pair of capacitors 52a and 52b. The switch 56 is connected in series to the DC power supply 57 between the terminals 13a and 13b. The inductances 55 and 58 are connected in series to the DC power supply 57 between the terminals 13a and 13b.

The transmission unit 50 can send a signal to the transmission device 2. The transmission unit 50 includes a transmission circuit 53, and a pulse transformer 54 connected to the transmission circuit 53. The transmission circuit 53 sends a signal through the pulse transformer 54. The signal is a differential signal.

The transmission unit 50 is connected to the pair of terminals 13 via the pair of capacitors 52a and 52b and via a pair of signal lines 51a and 51b. In more detail, the capacitor 52a has one end connected to the transmission unit 50, and has the other end connected to the terminal 13a via the signal line 51a. The capacitor 52b has one end connected to the transmission unit 50, and has the other end connected to the terminal 13b via the signal line 51b.

The inductance 55 has one end connected to the signal line 51a at a point between the other end of the capacitor 52a and the terminal 13a. The connection point between the one end of the inductance 55 and the signal line 51a is designated by S1. The inductance 55 has the other end connected to one end of the switch 56. The switch 56 has the other end connected to one end (in the illustrated example, the positive electrode end) of the DC power supply 57. The DC power supply 57 has the other end (in the illustrated example, the negative electrode end) connected to one end of the inductance 58. The inductance 58 has the other end connected to the signal line 51b at a point between the other end of the capacitor 52b and the terminal 13b. The connection point between the other end of the inductance 58 and the signal line 51b is designated by S2. The pair of inductances 55 and 58 is disposed on opposite sides of the DC power supply 57.

The transmission device 3 further includes a control circuit 40 and a buffer 96. The control circuit 40 is connected to the transmission unit 50 and to the reception unit 41. The buffer 96 is connected to the control circuit 40, to the transmission unit 50, and to the reception unit 41.

The control circuit 40 controls signal transmission performed by the transmission unit 50 and signal reception performed by the reception unit 41. The control circuit 40 also controls on-off switching of the switch 56. The control circuit 40 is configured similarly to the control circuit 17. The buffer 96 temporarily stores transmission data that is to be output to the transmission unit 50. The buffer 96 also temporarily stores reception data output from the reception unit 41.

An operation of the present embodiment will next be described. Signal transmission from the transmission device 2 to the transmission device 3 will first be described. The assumption is that the switch 24 is in an OFF state.

The signal, which is sent from the transmission unit 18, passes through signal transmission lines and then is received by the reception unit 41. In this case, the signal transmission lines are defined by the pair of capacitors 20a and 20b, the pair of signal lines 19a and 19b, the pair of signal lines 7a and 7b, the electrical coupler 6, the pair of signal lines 9a and 9b, the pair of signal lines 42a and 42b, and the pair of capacitors 43a and 43b.

Because the carrier wave is an alternating current (AC) signal, the transmission unit 18 is connected through the pair of capacitors 20a and 20b to the pair of signal lines 19a and 19b by AC coupling, and the reception unit 41 is connected through the pair of capacitors 43a and 43b to the pair of signal lines 42a and 42b by AC coupling.

As described above, the load resistor 47 is connected to the signal transmission lines via the inductances 46 and 48. This configuration allows the inductances 46 and 48 to have a combined impedance L set such that the load resistor 47 does not act as a load on the transmission lines with a frequency ω used in the signal transmission.

For example, when the transmission line has a characteristic impedance of 100Ω and the load resistor 47 has a resistance value R of 100Ω, the absence of the inductances 46 and 48 would cause the load resistor 47 to act as a load on the transmission line.

In contrast, the presence of the inductances 46 and 48 provides the combined impedance Z of the load resistor 47 and the inductances 46 and 48 with R+jωL, where j is the imaginary unit.

Thus, when the inductances 46 and 48 having an ωL value of, for example, 1 kΩ or higher where ω is a frequency used in signal transmission are used, the load resistor 47 connected to the transmission line provides a high impedance substantially ten or more times higher than the characteristic impedance. That is, the load resistor 47 becomes unlikely to act as a load with respect to the characteristic impedance, thereby reducing or eliminating the effect of the load resistor 47 on communication.

The inductances 23 and 26 are connected to the DC power supply 25 for the similar reason to that discussed above.

Figure 3:
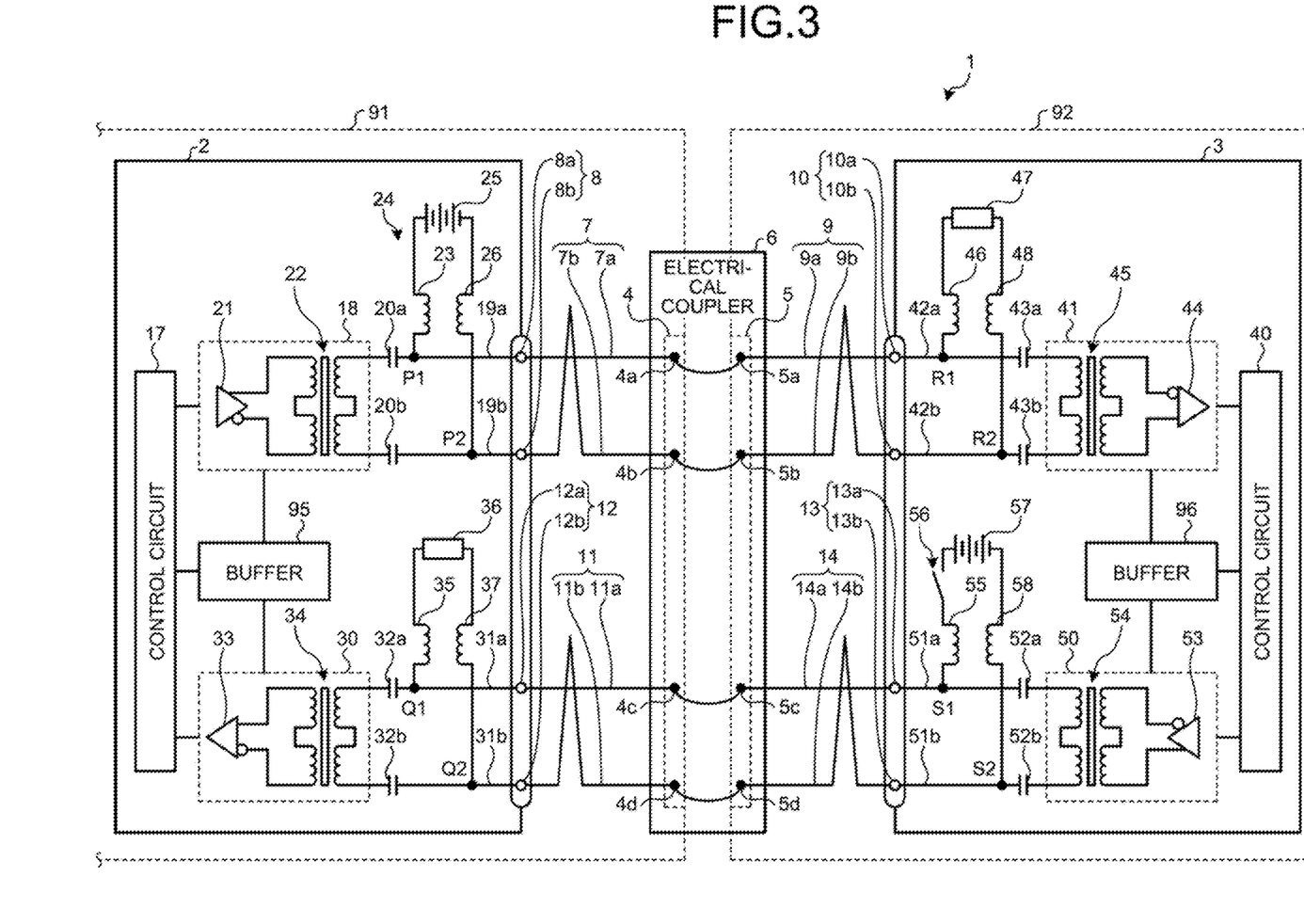
FIG. 3 is a diagram illustrating the inter-vehicle transmission system according to the first embodiment during superposition of a DC voltage.

Next, a description will be made as to an operation with the DC power supply 25 applying a DC voltage to the contacts 4a and 4b of the electrical coupler 4 and to the contacts 5a and 5b of the electrical coupler 5. FIG. 3 is a diagram illustrating the inter-vehicle transmission system according to the present embodiment during superposition of a DC voltage.

First, as illustrated in FIG. 3, the switch 24 is turned on under the control of the control circuit 17. When the switch 24 is placed in an ON state, the DC power supply 25 is electrically connected to the load resistor 47 through the electrical coupler 6. In more detail, this forms a closed circuit in which a DC current flows from the DC power supply 25, passes through the inductance 23, the signal line 19a, the terminal 8a, the signal line 7a, the contact 4a, the contact 5a, the signal line 9a, the terminal 10a, the signal line 42a, the inductance 46, the load resistor 47, the inductance 48, the signal line 42b, the terminal 10b, the signal line 9b, the contact 5b, the contact 4b, the signal line 7b, the terminal 8b, the signal line 19b, and the inductance 26, in order, and flows back to the DC power supply 25.

Thus, the DC power supply 25 forms a closed circuit together with the load resistor 47 during the ON state of the switch 24. This allows the DC power supply 25 to apply DC voltages between the contacts 4a and 5a and between the contacts 4b and 5b, such that when an oxide covering is formed on the surface of at least one of the contacts 4a, 4b, 5a, and 5b, such an oxide covering can be broken. The resistance value R of the load resistor 47 is adjusted to prevent an excessive DC current from flowing therethrough.

Note that, in the present embodiment, a signal is transmitted from the transmission unit 18 to the reception unit 41 irrespective of whether the switch 24 is in the ON state or not. The pair of capacitors 20a and 20b decouples the DC power supply 25 from the transmission unit 18 in terms of DC component. The pair of capacitors 43a and 43b decouples the DC power supply 25 from the reception unit 41 in terms of DC component. As described above, the load resistor 47 becomes unlikely to act as a load on the transmission lines. Similarly, due to the inductances 23 and 26 being connected in series to the DC power supply 25, the DC power supply 25 also becomes unlikely to act as a load on the transmission lines. The DC voltage has thus little or no effect on the signal transmission even when the DC voltage from the DC power supply 25 is applied to the electrical coupler 6.

In the present embodiment, the control circuit 17 limits the time duration of the ON state of the switch 24 during an operation of the inter-vehicle transmission system 1. In other words, the time duration of the OFF state of the switch 24 is set.

Maintaining the switch 24 constantly in the ON state would result in an increased amount of heat generation in the load resistor 47, and thus also result in an increased power consumption. In contrast, setting the time duration of the OFF state of the switch 24 limits the amount of heat generation in the load resistor 47, and thus also limits power consumption.

The control circuit 17 may provide on-off control on the switch 24 as follows, by way of example.

The switch 24 can be switched between the ON and OFF states periodically by the control circuit 17. For example, a ratio of an ON duration to an OFF duration of 1:9 can reduce the amount of heat generation to one tenth of the amount of heat generation when the switch 24 is constantly maintained in the ON state.

The control circuit 17 can also places the switch 24 in the ON state for a certain time period since the start-up of the inter-vehicle transmission system 1, and then turn off the switch 24 after a lapse of that time period. This can break the oxide covering formed on the surface of at least one of the contacts 4a, 4b, 5a, and 5b after the start-up. The term "start-up of the inter-vehicle transmission system 1", as used herein, refers to a time point when the inter-vehicle transmission system 1 is powered to start up. In more detail, such term refers to the time of start-up of the power supplies on the entire train including the vehicles 91 and 92.

The control circuit 17 can also places the switch 24 in the ON state for a certain time period since the time point when the electrical coupler 4 and the electrical coupler 5 are electrically coupled together, and then turn off the switch 24 after a lapse of that time period. This can break the oxide covering formed on the surface of at least one of the contacts 4a, 4b, 5a, and 5b after the electrical coupler 4 and the electrical coupler 5 are coupled together.

The switch 24 may be placed by the control circuit 17 in the ON state when the buffer 95 contains no transmission data, and in the OFF state when the buffer 95 contains transmission data. In this case, the control circuit 17 monitors whether the buffer 95 contains transmission data. The control circuit 17 turns on the switch 24 if the buffer 95 contains no transmission data, and turns off the switch 24 if the buffer 95 contains transmission data. That is, the switch 24 is in the OFF state during communication.

The control circuit 17 can places the switch 24 in the ON state for a certain time period since detection of erroneous transmission, and then turn off the switches 24a, 24b after a lapse of that time period. The control circuit 17 determines that erroneous transmission has occurred when no response to a signal transmitted from the transmission unit 18 to the reception unit 41 is received from the transmission unit 50. This reduces the erroneous transmission due to an oxide covering formed on the surface of at least one of the contacts 4a, 4b, 5a, and 5b.

The control circuit 17 may switch the switch 24 between ON and OFF states in response to an instruction from a higher system not shown. The higher system may be, for example, a train information management system included in the train including the vehicles 91 and 92.

The transmission device 3 transmits a signal to the transmission device 2 in the same manner as discussed above. The DC power supply 57 applies DC voltages to the contacts 4c and 4d of the electrical coupler 4 and to the contacts 5c and 5d of the electrical coupler 5 in the same manner as discussed above.

According to the present embodiment, as described above, the provision of the switch 24 and 56 reduces the amounts of heat generated in the load resistors 47 and 36, and thus reduces power consumption. Further, when an oxide covering is formed on the surface of at least one of the contacts 4a to 4d and the contacts 5a to 5d of the electrical coupler 6, such oxide covering can be broken.

In the present embodiment, the switches 24 and 56 are disposed on the transmission side. This allows the control circuits 17 and 40 to control the timing of signal transmission and the timing at which to switch on and off the switches 24 and 56. Other advantages of the inter-vehicle transmission system 1 of the present embodiment are achieved as described in connection with the description of the operation.

In the present embodiment, the inductances 23 and 26 are disposed on opposite sides of the DC power supply 25. This configuration results in a symmetrical arrangement of the DC power supply 25 and the inductances 23 and 26 with respect to the pair of signal lines 7. This arrangement is preferable for a balanced transmission line. However, either one of the inductances 23 and 26 may be disposed.

Similarly, the inductances 46 and 48 are disposed on opposite sides of the load resistor 47, but either one of the inductances 46 and 48 may be disposed. Moreover, although the inductances 55 and 58 are disposed on opposite sides of the DC power supply 57, either one of the inductances 55 and 58 may be disposed. Similarly, although the inductances 35 and 37 are disposed on opposite sides of the load resistor 36, either one of the inductances 35 and 37 may be disposed.

Note that the DC power supply 25 may be a dedicated power supply, or may be a voltage source of a voltage converted from the voltage of another power supply installed in the vehicle 91. The same goes for the DC power supply 57.

Second Embodiment

Figure 4:
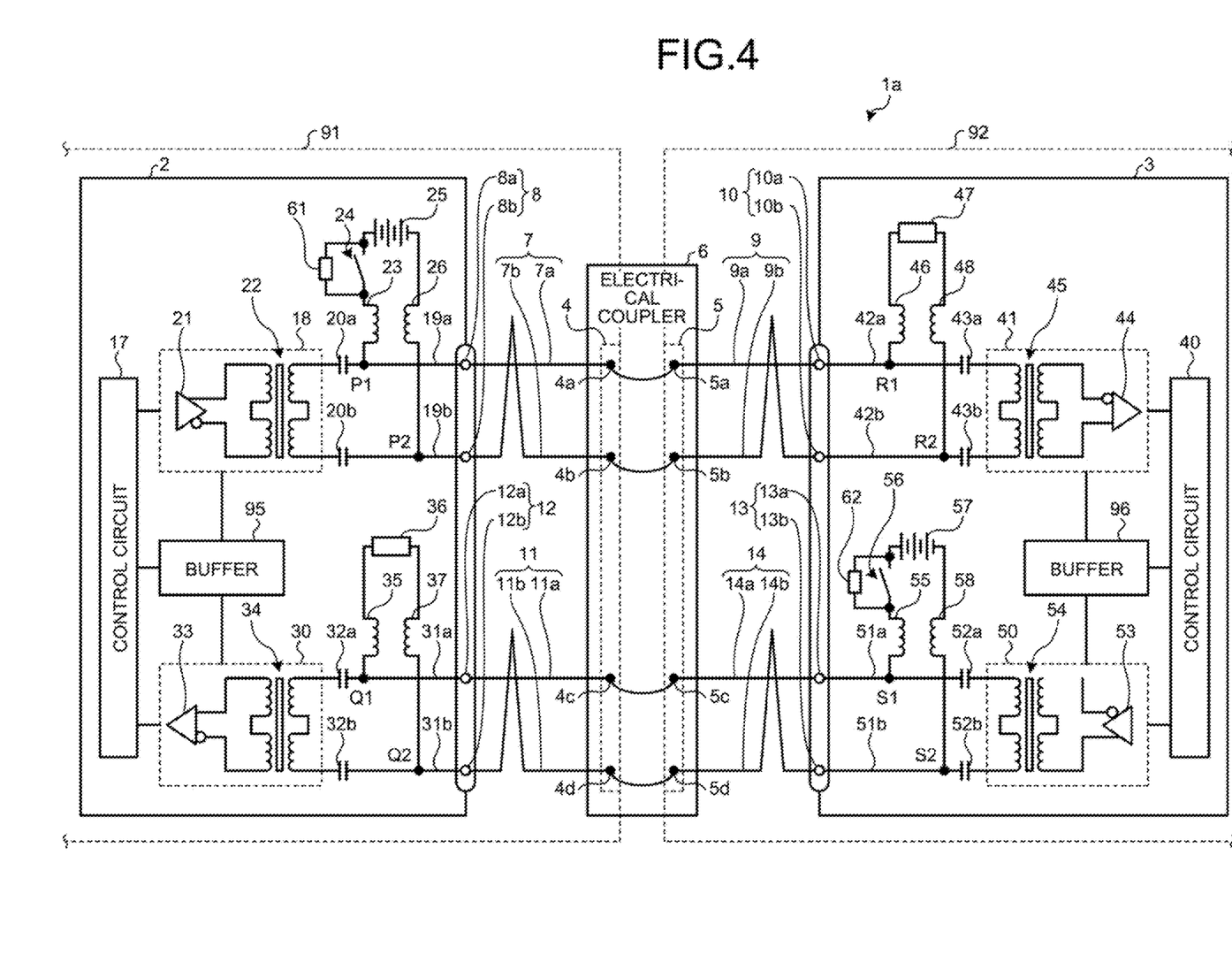
FIG. 4 is a diagram illustrating a configuration of an inter-vehicle transmission system according to a second embodiment.

FIG. 4 is a diagram illustrating a configuration of an inter-vehicle transmission system according to the present embodiment. An inter-vehicle transmission system 1a differs from the inter-vehicle transmission system 1 illustrated in FIG. 1 in that the transmission device 2 includes a resistor 61 and the transmission device 3 includes a resistor 62. The resistor 61 is connected in parallel to the switch 24 and in series to the DC power supply 25. The resistor 62 is connected in parallel to the switch 56 and in series to the DC power supply 57. The other part of the configuration of the inter-vehicle transmission system 1a is the same as that of the configuration of the inter-vehicle transmission system 1 illustrated in FIG. 1. In FIG. 4, like reference characters designate the same components as the components illustrated in FIG. 1.

When the switch 24 is switched from the ON state to the OFF state, a high voltage induced by the inductances 23, 26, 46 and 48 may develop between the contact portions of the switch 24, thereby wearing the contact portions of the switch 24.

Connecting the resistor 61 in parallel to the switch 24, as in the present embodiment, reduces or prevents the development of the high voltage between the contact portions of the switch 24, thereby reducing or preventing wear of the contact portions of the switch 24.

Similarly, connecting the resistor 62a in parallel to the switch 56 reduces or prevents development of the high voltage between the contact portions of the switch 56, thereby reducing or preventing wear of the contact portions of the switch 56.

Other operations and advantages of the inter-vehicle transmission system 1a of the present embodiment are similar to those of the inter-vehicle transmission system of the first embodiment.

Third Embodiment

Figure 5:
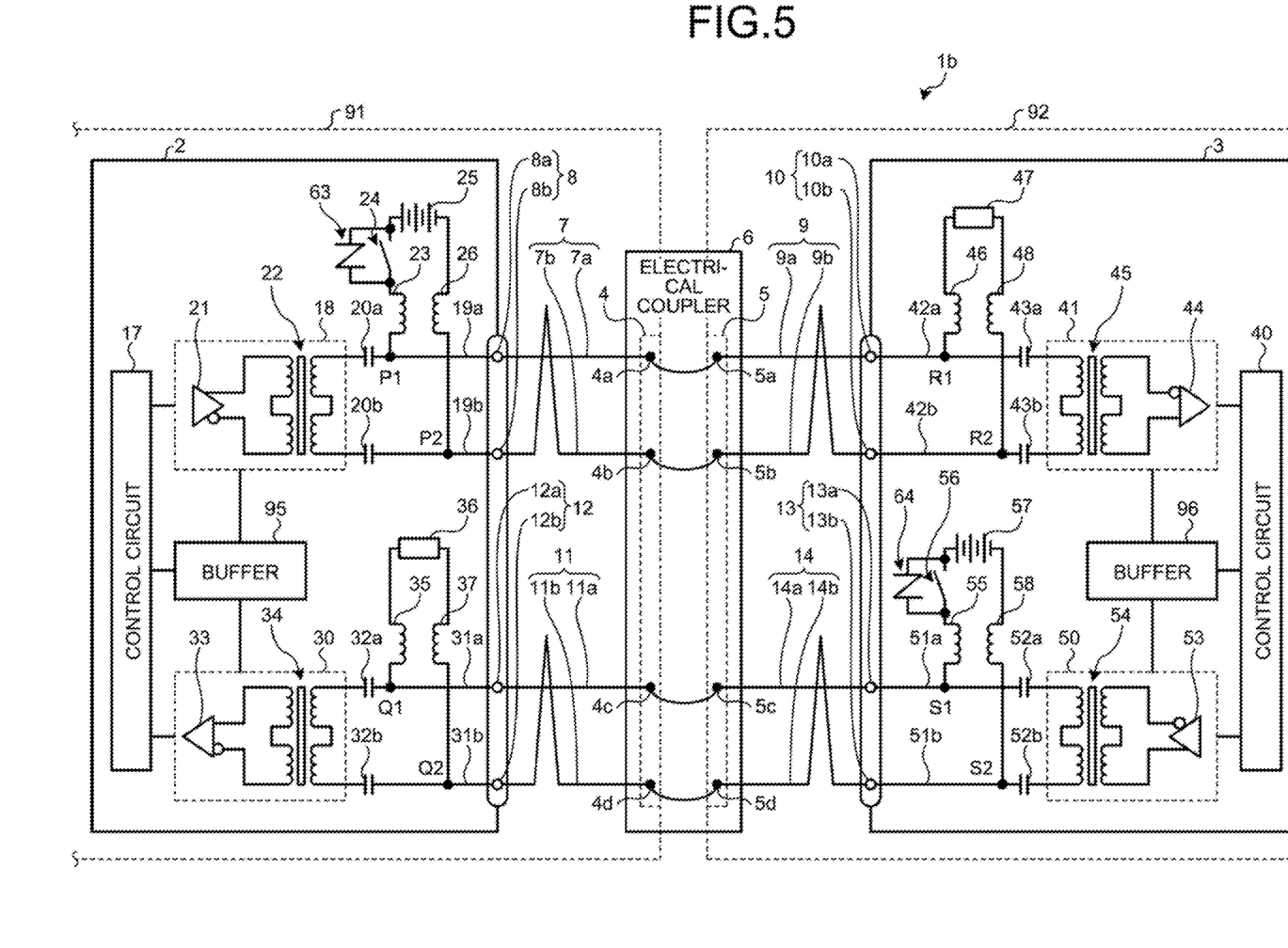
FIG. 5 is a diagram illustrating a configuration of an inter-vehicle transmission system according to a third embodiment.

FIG. 5 is a diagram illustrating a configuration of an inter-vehicle transmission system according to the present embodiment. An inter-vehicle transmission system 1b differs from the inter-vehicle transmission system 1a illustrated in FIG. 4 in that the transmission device 2 includes a varistor 63 in place of the resistor 61, and that the transmission device 3 includes a varistor 64 in place of the resistor 62. The other part of the configuration of the inter-vehicle transmission system 1b is the same as that of the configuration of the inter-vehicle transmission system 1a illustrated in FIG. 4. In FIG. 5, like reference characters designate the same components as the components illustrated in FIG. 4.

When the switch 24 is switched from the ON state to the OFF state, a high voltage induced by the inductances 23, 26, 46 and 48 may develop between the contact portions of the switch 24, thereby wearing the contact portions of the switch 24.

Connecting the varistor 63a in parallel to the switch 24, as in the present embodiment, reduces or prevents the development of the high voltage between the contact portions of the switch 24, thereby reducing or preventing wear of the contact portions of the switch 24.

Similarly, connecting the varistor 64a in parallel to the switch 56 reduces or prevents the development of the high voltage between the contact portion of the switch 56, thereby reducing or preventing wear of the contact portions of the switch 56.

Other operations and advantages of the inter-vehicle transmission system 1b of the present embodiment are similar to those of the inter-vehicle transmission system of the first and second embodiments.

Fourth Embodiment

Figure 6:
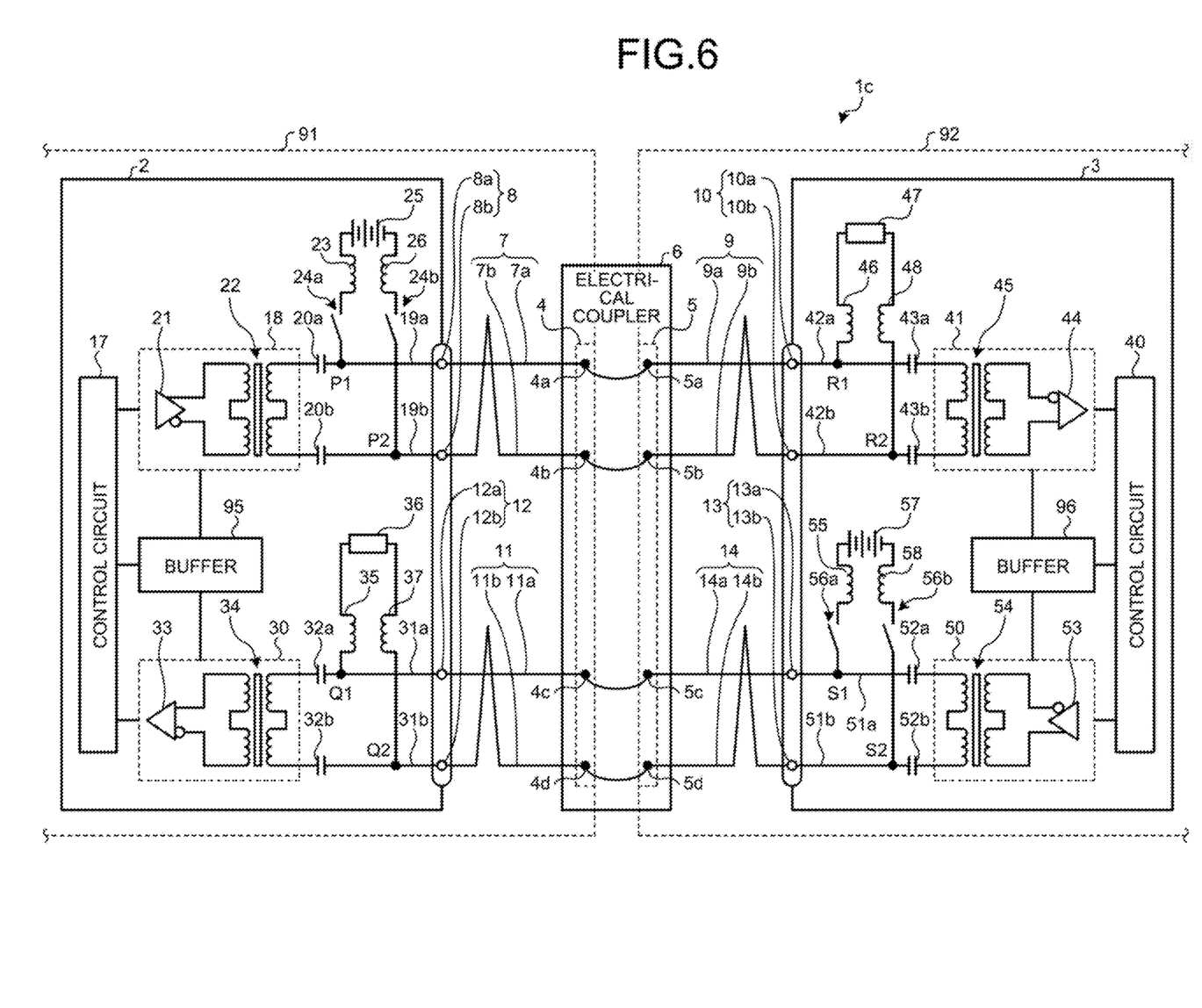
FIG. 6 is a diagram illustrating a configuration of an inter-vehicle transmission system according to a fourth embodiment.

FIG. 6 is a diagram illustrating a configuration of an inter-vehicle transmission system according to the present embodiment. As illustrated in FIG. 6, an inter-vehicle transmission system 1c differs from the inter-vehicle transmission system 1 illustrated in FIG. 1 in that the transmission device 2 includes a pair of switches 24a and 24b, the inductance 23, and the inductance 26. The inductance 23 is disposed between the switch 24a and the DC power supply 25. The inductance 26 is disposed between the switch 24b and the DC power supply 25.

The inter-vehicle transmission system 1c further differs from the inter-vehicle transmission system 1 illustrated in FIG. 1 in that the transmission device 3 includes a pair of switches 56a and 56b, the inductance 55, and the inductance 58. The inductance 55 is disposed between the switch 56a and the DC power supply 57. The inductance 58 is disposed between the switch 56b and the DC power supply 57. The other part of the configuration of the present embodiment is the same as that of the inter-vehicle transmission system 1 illustrated in FIG. 1. In FIG. 6, like reference characters designate the same components as the components illustrated in FIG. 1.

In the above configuration, the pair of switches 24a and 24b is turned off to thereby disconnect the DC power supply 25 and the inductances 23 and 26 from the signal transmission lines. This prevents the characteristic impedances of the transmission lines from being affected by the DC power supply 25 and the inductances 23 and 26 during the OFF state of the pair of switches 24a and 24b.

In addition, in the above configuration, the pair of switches 56a and 56b is turned off to thereby disconnect the DC power supply 57 and the inductances 55 and 58 from the signal transmission lines. This prevents the characteristic impedances of the transmission lines from being affected by the DC power supply 57 and the inductances 55 and 58 during the OFF state of the pair of switches 56a and 56b.

Note that if one of the inductances 23 and 26 is provided, only one of the pair of switches 24a and 24b may be provided. That is, if only the inductance 23 of the inductances 23 and 26 is provided, it is only required that the switch 24a of the pair of switches 24a and 24b be provided. If only the inductance 26 of the inductances 23 and 26 is provided, it is only required that the switch 24b of the pair of switches 24a and 24b be provided.

Other operations and advantages of the inter-vehicle transmission system 1c of the present embodiment are similar to those of the inter-vehicle transmission system of the first embodiment.

Fifth Embodiment

Figure 7:
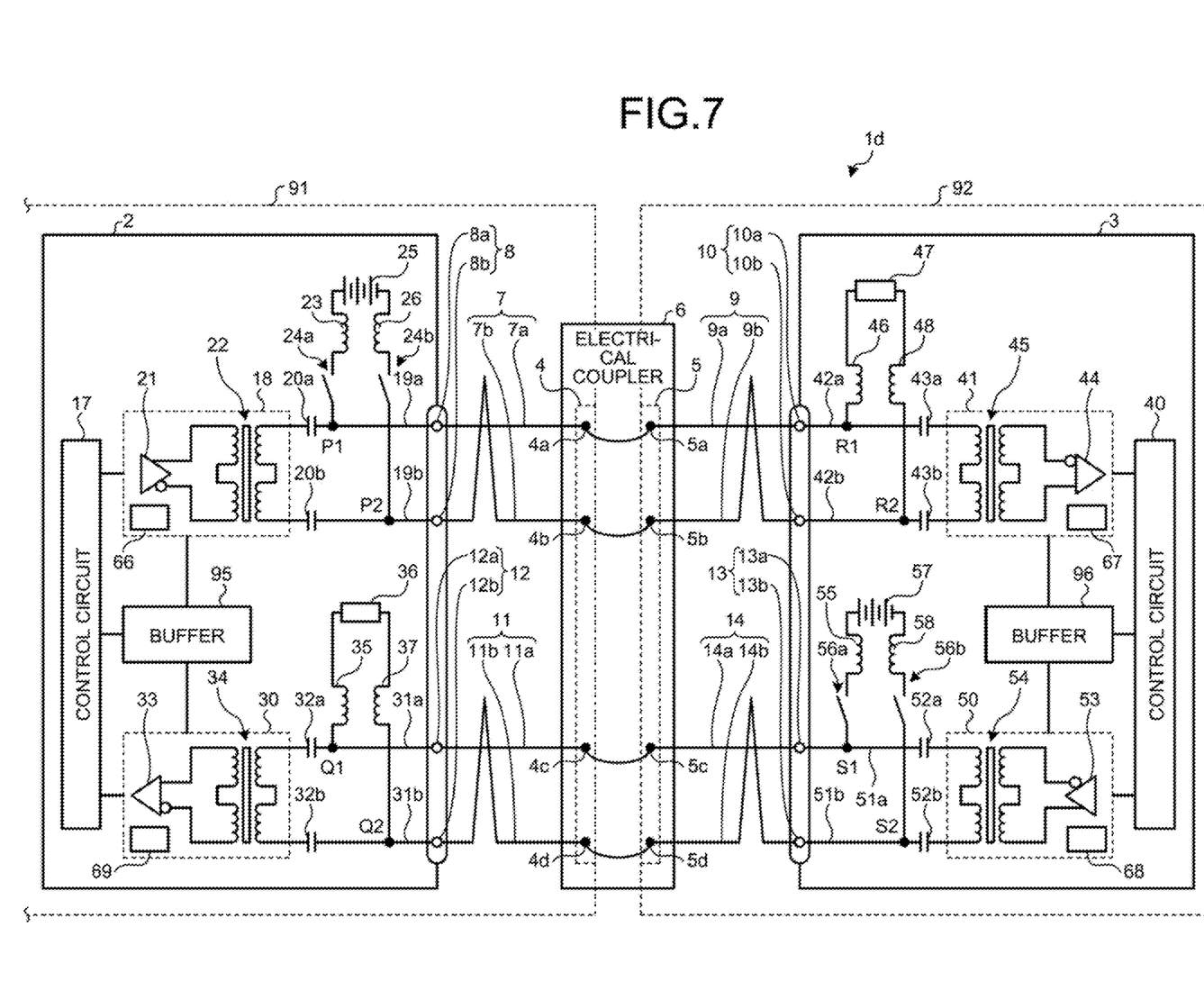
FIG. 7 is a diagram illustrating a configuration of an inter-vehicle transmission system according to a fifth embodiment.
Figure 8:
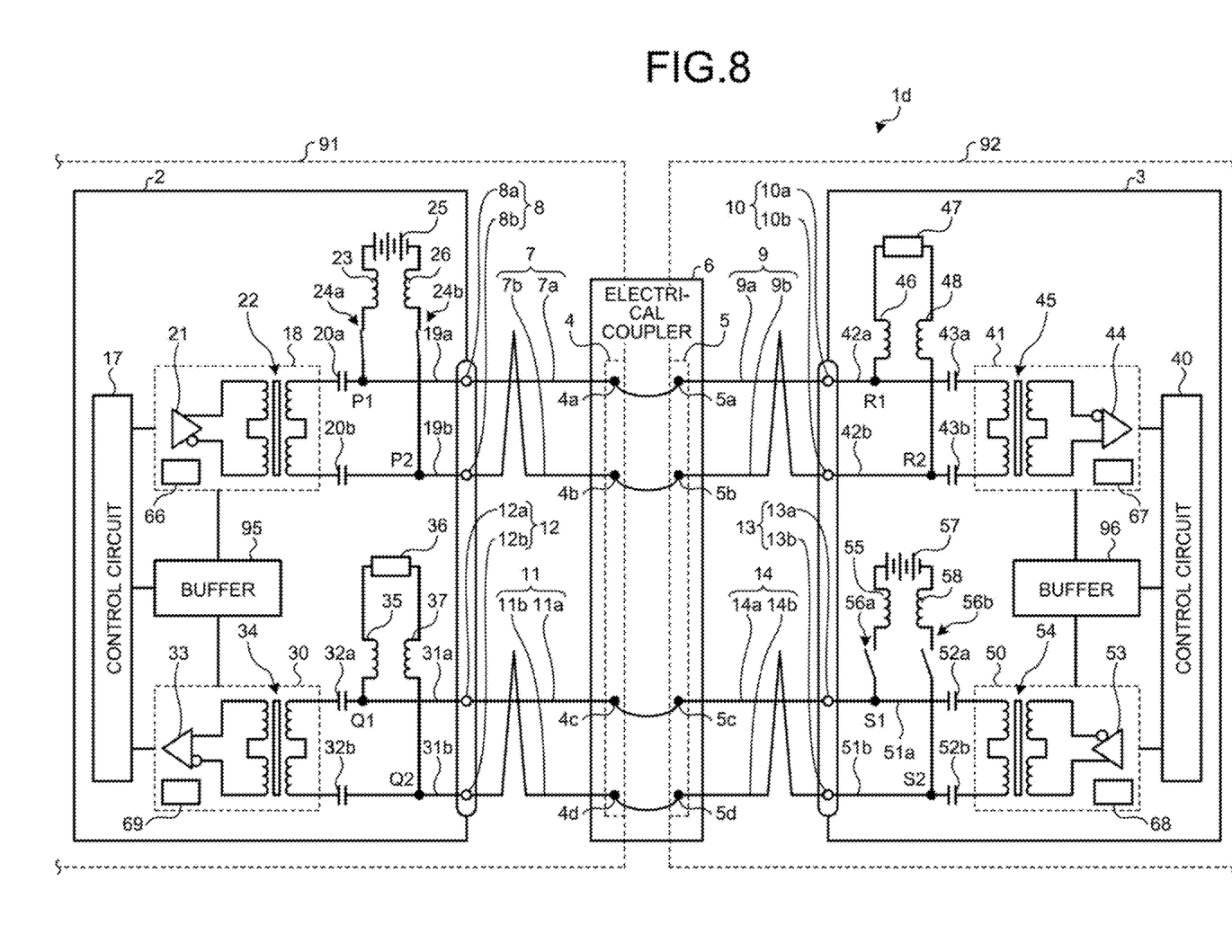
FIG. 8 is a diagram illustrating the inter-vehicle transmission system according to the fifth embodiment during superposition of a DC voltage.

FIG. 7 is a diagram illustrating a configuration of an inter-vehicle transmission system according to the present embodiment. FIG. 8 is a diagram illustrating the inter-vehicle transmission system according to the present embodiment during superposition of a DC voltage. As illustrated in FIGS. 7 and 8, an inter-vehicle transmission system 1d differs from the inter-vehicle transmission system 1c illustrated in FIG. 6 as follows.

The transmission device 2 includes a switching unit 66 in the transmission unit 18, and includes a switching unit 69 in the reception unit 30. The transmission device 3 includes a switching unit 67 in the reception unit 41, and includes a switching unit 68 in the transmission unit 50.

The switching units 66 and 67 can switch the mode of signal transmission from the transmission unit 18 to the reception unit 41 between a transmission mode based on 10BASE-T and a transmission mode based on 100BASE-TX. The switching units 68 and 69 can switch the mode of signal transmission from the transmission unit 50 to the reception unit 30 between a transmission mode based on 10BASE-T and a transmission mode based on 100BASE-TX.

Note that 10BASE-T and 100BASE-TX are Ethernet (registered trademark) standards. The present embodiment is premised on communication based on an Ethernet (registered trademark) standard. Communication based on 10BASE-T and communication based on 100BASE-TX differ from each other in the amplitude and frequency of a signal. Communication based on 100BASE-TX provides a transmission rate higher than the transmission rate of communication based on 10BASE-T. On the other hand, 100BASE-TX communication requires a more severe characteristic of a transmission line than 10BASE-T communication does.

The other part of the configuration of the inter-vehicle transmission system of the present embodiment is the same as that of the inter-vehicle transmission system 1c illustrated in FIG. 6. In FIGS. 7 and 8, like reference characters designate the same components as the components illustrated in FIG. 6.

An operation of the present embodiment will next be described. During the OFF state of the switches 24a and 24b as illustrated in FIG. 7, signal transmission from the transmission unit 18 to the reception unit 41 is performed on the basis of 100BASE-TX. In this case, the switching unit 66 selects the transmission mode based on 100BASE-TX, and instructs a transmission circuit 21 to send a signal in this mode. The switching unit 67 selects the transmission mode based on 100BASE-TX, and instructs the reception unit 41 to receive a signal in this mode.

The configuration illustrated in FIG. 7 provides no superposition of DC voltage on a signal from the transmission unit 18 to the reception unit 41. In this case, the transmission mode based on 100BASE-TX providing a higher transmission rate is selected.

In contrast, as illustrated in FIG. 8, when the switches 24a and 24b are placed in an ON state, signal transmission from the transmission unit 18 to the reception unit 41 is performed based on 10BASE-T. In this case, the switching unit 66 selects the transmission mode based on 10BASE-T, and instructs the transmission circuit 21 to send a signal in this mode. The switching unit 67 selects the transmission mode based on 10BASE-T, and instructs the reception unit 41 to receive a signal in this mode.

In more detail, upon application of a DC voltage to the electrical coupler 6, the control circuit 17 turns on the switches 24a and 24b, and notifies the switching unit 66 that the switches 24a and 24b have been turned on. As a result, the switching unit 66 causes the transmission unit 18 to send a signal containing switchover information to the reception unit 41, after which the switching unit 66 performs a switchover from the transmission mode based on 100BASE-TX to the transmission mode based on 10BASE-T. The switchover information is information indicating that the transmission mode has been switched from 100BASE-TX to 10BASE-T.

The reception unit 41 receives from the transmission unit 18 a signal containing the switchover information. This causes the switching unit 67 to perform a switchover from the transmission mode based on 100BASE-TX to the transmission mode based on 10BASE-T.

Thus, during application of a DC voltage by the DC power supply 25 to the electrical coupler 6, a signal is transmitted from the transmission unit 18 to the reception unit 41 on the basis of 10BASE-T. In this case, a DC voltage is superimposed on a signal from the transmission unit 18 to the reception unit 41, and therefore the transmission mode based on 10BASE-T requiring a less severe characteristic of a transmission line is selected.

After a lapse of a certain time period, the control circuit 17 turns off the switches 24a and 24b, and notifies the switching unit 66 that the switches 24a and 24b have been turned off. As a result, the switching unit 66 causes the transmission unit 18 to send a signal containing the switchover information to the reception unit 41, after which the switching unit 66 performs a switchover from the transmission mode based on 10BASE-T to the transmission mode based on 100BASE-TX. The switchover information is information indicating that the transmission mode has been switched from 10BASE-T to 100BASE-TX.

The reception unit 41 receives a signal containing the switchover information, from the transmission unit 18. This causes the switching unit 67 to perform a switchover from the transmission mode based on 10BASE-T to the transmission mode based on 100BASE-TX.

Thus, a signal is transmitted from the transmission unit 18 to the reception unit 41 again on the basis of 100BASE-TX.

According to the present embodiment, during application of a DC voltage of the DC power supply 25 to the electrical coupler 6, a signal is transmitted in the transmission mode based on 10BASE-T, thereby improving noise tolerance.

Although, in the present embodiment, the switching units 66 and 67 can switch the mode of signal transmission from the transmission unit 18 to the reception unit 41 between the transmission mode based on 10BASE-T and the transmission mode based on 100BASE-TX, this switchover can be achieved in a generic manner.

That is, the switching units 66 and 67 may be configured to switch the mode of signal transmission from the transmission unit 18 to the reception unit 41 between two transmission modes providing transmission rates different from each other. In this case, the switching units 66 and 67 select the transmission mode providing the higher transmission rate during the OFF state of the switches 24a and 24b, and select the transmission mode providing the lower transmission rate during the ON state of the switches 24a and 24b.

Generally, a transmission mode providing a higher transmission rate requires more severe characteristic of a transmission line. Thus, performing a switchover as described above provides an advantage similar to the switchover between 10BASE-T and 100BASE-TX.

The above description has been made as to signal transmission from the transmission unit 18 to the reception unit 41. The same goes for signal transmission from the transmission unit 50 to the reception unit 30.

Other operations and advantages of the inter-vehicle transmission system of the present embodiment are similar to those of the inter-vehicle transmission systems of the first and the fourth embodiments.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

1, 1a, 1b, 1c, 1d inter-vehicle transmission system; 2, 3 transmission device; 4, 5, 6 electrical coupler; 4a, 4b, 4c, 4d, 5a, 5b, 5c, 5d contact unit; 7, 7a, 7b, 9, 9a, 9b, 11, 11a, 11b, 14, 14a, 14b, 19a, 19b, 31a, 31b, 42a, 42b, 51a, 51b signal line; 8, 8a, 8b, 10, 10a, 10b, 12, 12a, 12b, 13, 13a, 13b terminal; 17, 40 control circuit; 17a processor; 17b memory; 18, 50 transmission unit; 20a, 20b, 32a, 32b, 43a, 43b, 52a, 52b capacitor; 21, 53 transmission circuit; 22, 34, 45, 54 pulse transformer; 23, 26, 35, 37, 46, 48, 55, 58 inductance; 24, 24a, 24b, 56, 56a, 56b switch; 25, 57 DC power supply; 30, 41 reception unit; 33, 44 reception circuit; 36, 47 load resistor; 61, 62 resistor; 63, 64 varistor; 66, 67, 68, 69 switching unit; 91, 92 vehicle; 95, 96 buffer.

The invention claimed is:

1. An inter-vehicle transmission system comprising:
a first transmission device disposed in a first vehicle including a first electrical coupler; and
a second transmission device disposed in a second vehicle including a second electrical coupler electrically connected to the first electrical coupler, the second transmission device being capable of communicating with the first transmission device,
wherein
the first transmission device includes
a first pair of terminals connected to the first electrical coupler via a first pair of signal lines,
a transmitter connected to the first pair of terminals via a first pair of capacitors,
a direct-current power supply connected in series between the first pair of terminals without interposition of the first pair of capacitors, and
a switch connected in series to the direct-current power supply between the first pair of terminals,
a first inductance connected in series to the DC power supply between the first pair of terminals, the first inductance being connected between the switch and one of the first pair of signal lines, and
the second transmission device includes
a second pair of terminals connected to the second electrical coupler via a second pair of signal lines,
a receiver connected to the second pair of terminals via a second pair of capacitors,
a load resistor connected in series between the second pair of terminals without interposition of the second pair of capacitors, and
a second inductance connected in series to the load resistor between the second pair of terminals,
wherein
the transmitter and the receiver are connected to each other in series via the first pair of signal lines, the first electrical coupler, the second electrical coupler, and the second pair of signal lines, and
the switch is placed in an ON state for a certain predetermined time period beginning at start-up of the inter-vehicle transmission system, and the switch is turned off after a lapse of the certain predetermined time period, or
the switch is placed in an ON state for the certain predetermined time period beginning when the first electrical coupler and the second electrical coupler have been electrically coupled together, and the switch is turned off after the lapse of the certain predetermined time period.

2. The inter-vehicle transmission system according to claim 1, wherein the first transmission device includes a resistor connected in parallel to the switch and in series to the direct-current power supply.

3. The inter-vehicle transmission system according to claim 1, wherein the first transmission device includes a varistor connected in parallel to the switch and in series to the direct-current power supply.

4. An inter-vehicle transmission system comprising:
a first transmission device disposed in a first vehicle including a first electrical coupler; and
a second transmission device disposed in a second vehicle including a second electrical coupler electrically connected to the first electrical coupler, the second transmission device being capable of communicating with the first transmission device,
wherein
the first transmission device includes
a first pair of terminals connected to the first electrical coupler via a first pair of signal lines,
a transmitter connected to the first pair of terminals via a first pair of capacitors,
a direct-current power supply connected in series between the first pair of terminals without interposition of the first pair of capacitors, and
a switch connected in series to the direct-current power supply between the first pair of terminals,
a first inductance connected in series to the DC power supply between the first pair of terminals, and
the second transmission device includes
a second pair of terminals connected to the second electrical coupler via a second pair of signal lines,
a receiver connected to the second pair of terminals via a second pair of capacitors,
a load resistor connected in series between the second pair of terminals without interposition of the second pair of capacitors, and
a second inductance connected in series to the load resistor between the second pair of terminals,
wherein
the first inductance is disposed between the switch and the direct-current power supply,
wherein
a signal is transmitted from the transmitter to the receiver at a transmission rate, the transmission rate being switchable between a transmission rate when the switch is in an OFF state and a transmission rate when the switch is in an ON state, and
the transmission rate when the switch is in the ON state is lower than the transmission rate when the switch is in the OFF state.

5. The inter-vehicle transmission system according to claim 4, wherein the signal is transmitted from the transmitter to the receiver on a basis of 100BASE-TX when the switch is in the OFF state, and wherein the signal is transmitted from the transmitter to the receiver on the basis of 10BASE-T when the switch is in the ON state.

6. The inter-vehicle transmission system according to claim 1, wherein the switch is switched between ON and OFF states periodically.

7. The inter-vehicle transmission system according to claim 1, wherein
the first transmission device includes a buffer to store transmission data that is to be output to the transmitter, and
the switch is in the ON state when the buffer does not contain the transmission data, and the switch is in an OFF state when the buffer contains the transmission data.

8. The inter-vehicle transmission system according to claim 1, wherein the switch is placed in the ON state for the certain time period since detection of erroneous transmission, and is turned off after a lapse of the certain time period.

9. The inter-vehicle transmission system according to claim 4, wherein the switch is switched between ON and OFF states periodically.

10. The inter-vehicle transmission system according to claim 4, wherein the switch is placed in an ON state for a certain time period since start-up of the inter-vehicle transmission system, and is turned off after a lapse of the certain time period.

11. The inter-vehicle transmission system according to claim 4, wherein the switch is placed in an ON state for a certain time period since a time point when the first electrical coupler and the second electrical coupler are electrically coupled together, and the switch is turned off after a lapse of the certain time period.

12. The inter-vehicle transmission system according to claim 4, wherein
the first transmission device includes a buffer to store transmission data that is to be output to the transmitter, and
the switch is in an ON state when the buffer does not contain the transmission data, and the switch is in an OFF state when the buffer contains the transmission data.

13. The inter-vehicle transmission system according to claim 4, wherein the switch is placed in an ON state for a certain time period since detection of erroneous transmission, and is turned off after a lapse of the certain time period.

* * * * *